(12) United States Patent
Kucherov et al.

(10) Patent No.: US 10,996,853 B2
(45) Date of Patent: May 4, 2021

(54) DEDUPLICATED DATA BLOCK OWNERSHIP DETERMINATION

(71) Applicant: EMC IP Holding Company LLC, Hopkinton, MA (US)

(72) Inventors: Anton Kucherov, Dudley, MA (US); Uri Shabi, Tel Mond (IL); Ronen Gazit, Tel Aviv (IL); Vladimir Shveidel, Pardes-Hana (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 98 days.

(21) Appl. No.: 16/526,181

(22) Filed: Jul. 30, 2019

(65) Prior Publication Data

US 2021/0034247 A1 Feb. 4, 2021

(51) Int. Cl.
| | |
|---|---|
| *G06F 12/00* | (2006.01) |
| *G06F 13/00* | (2006.01) |
| *G06F 13/28* | (2006.01) |
| *G06F 3/06* | (2006.01) |
| *G06F 7/523* | (2006.01) |
| G06F 16/174 | (2019.01) |
| G06F 16/215 | (2019.01) |

(52) U.S. Cl.
CPC .......... *G06F 3/0607* (2013.01); *G06F 3/0641* (2013.01); *G06F 3/0652* (2013.01); *G06F 3/0659* (2013.01); *G06F 3/0683* (2013.01); *G06F 7/523* (2013.01); *G06F 16/174* (2019.01); *G06F 16/1748* (2019.01); *G06F 16/215* (2019.01)

(58) Field of Classification Search
CPC .. G06F 3/0641; G06F 16/174; G06F 16/1748; G06F 16/215
USPC .......................................................... 711/154
See application file for complete search history.

(56) References Cited

U.S. PATENT DOCUMENTS

| | | | |
|---|---|---|---|
| 2012/0290629 A1* | 11/2012 | Beaverson | ............ G06F 16/137 707/827 |
| 2014/0101425 A1* | 4/2014 | Walters | ................... G06F 9/441 713/2 |

* cited by examiner

*Primary Examiner* — Charles Rones
*Assistant Examiner* — Sidney Li
(74) *Attorney, Agent, or Firm* — Muirhead and Saturnelli, LLC

(57) ABSTRACT

Techniques for determining unique ownership of data blocks includes selecting a first data block referenced by a first logical address of a first logical device, wherein first metadata for the first data block includes a reference count and a result used in determining sole unique ownership of the first data block; determining C1, an expected value of the result of the first metadata when the first logical device is a sole unique owner of the first data block; and performing first processing that determines whether the first logical device is the sole unique owner of the first data block. The first processing includes: determining whether C1 equals a current value of the result of the first metadata; and determining that the first logical device is the sole unique owner of the first data block if C1 equals the current value of the result of the first metadata.

20 Claims, 11 Drawing Sheets

| Row ID 506 | Prime #s/ Pi values 502 | Reference counts 504 | | | | | |
|---|---|---|---|---|---|---|---|
| | | 1 | 2 | 3 | 4 | 5 | ... |
| 1 | 2 | | | 8 | 16 | | |
| 2 | 3 | | | 10 | 13 | | |
| 3 | 5 | | | :: | 3 | | |
| 4 | 7 | | | :: | 4 | | |
| 5 | 11 | | | :: | 4 | | |
| 6 | 13 | | | :: | 1 | | |

\* Entries are computed using EQUATION A4 where PRIMEMAX=17

FIG. 5

| Row ID 506 | Prime #s/ Pi values 502 | Reference counts 504 | | | | | |
|---|---|---|---|---|---|---|---|
| | | 1 | 2 | 3 | 4 | 5 | ... |
| 1 | 2 | 2 | 4 | 8 | 16 | 32 | ... |
| 2 | 3 | 3 | 9 | 27 | 81 | 243 | ... |
| 3 | 5 | 5 | 25 | 125 | 625 | 3125 | ... |
| 4 | 7 | 7 | 49 | ... | ... | ... | ... |
| 5 | 11 | 11 | 132 | ... | ... | ... | ... |
| 6 | 13 | 13 | 169 | ... | ... | ... | ... |

| Pi | MMI (Pi) or Pi⁻¹ |
|---|---|
| 2 | 9 |
| 3 | 6 |
| 5 | 7 |
| 7 | 5 |
| 11 | 14 |
| 13 | 4 |

*Values of MMI computed using PRIMEMAX=17

FIG. 7

DEDUPLICATED DATA BLOCK OWNERSHIP DETERMINATION

BACKGROUND

Technical Field

This application generally relates to data storage and, more particularly, to techniques for determining ownership of data blocks.

Description of Related Art

Systems may include different resources used by one or more host processors. The resources and the host processors in the system may be interconnected by one or more communication connections, such as network connections. These resources may include data storage devices such as those included in the data storage systems. The data storage systems may be coupled to one or more host processors and provide storage services to each host processor. Multiple data storage systems from one or more different vendors may be connected and may provide common data storage for the one or more host processors.

A host may perform a variety of data processing tasks and operations using the data storage system. For example, a host may issue I/O operations, such as data read and write operations, received at a data storage system. The host systems may store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device may also be provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host may be directed to a particular storage entity, such as a file or logical device. The logical devices may or may not correspond to the actual physical drives. Allowing multiple host systems to access the single data storage system allows the host systems to share data stored therein.

SUMMARY OF THE INVENTION

Various embodiments of the techniques herein may include a method, a system and a computer readable medium for determining unique ownership of data blocks. A first data block, referenced by a first logical address of a first logical device, is selected. First metadata for the first data block includes a reference count and a result and the reference count denotes a number of references to the first data block and the result denotes a value used in determining sole unique ownership of the first data block. C1 is determined where C1 is an expected value of the result of the first metadata when the first logical device is a sole unique owner of the first data block. First processing is performed that determines whether the first logical device is the sole unique owner of the first data block. The first processing includes determining whether C1 equals a current value of the result of the first metadata; and responsive to determining C1 equals the current value of the result of the first metadata, determining that the first logical device is the sole unique owner of the first data block, and otherwise determining that the first logical device is not the sole unique owner of the first data block. C1 may be determined using the reference count, a maximum prime number, a first prime number that is uniquely assigned to the first logical device. The first logical device may be one of a plurality of logical devices and each of the plurality of logical devices may be assigned a different prime number less than the maximum prime number.

In at least one embodiment, processing may be performed that includes writing first data to the first logical address of the first logical device; and responsive to said writing, performing second processing. The second processing may include associating the first data block with the first logical address, wherein the first logical address references the first data block; incrementing the reference count of the first metadata of the first data block; and updating the result of the first metadata from a first value to a second value. Updating may include determining a first product by multiplying the first value by the first prime number that is assigned to the first logical device; and determining the second value as the first value modulo the maximum prime number. The second processing may include determining that the first data written to the first logical address is a duplicate of other data currently stored in the first data block; and updating the first logical address to reference the first data block. The second processing may include determining that the first data written to the first logical address is not a duplicate of other data currently stored; allocating physical storage for the first data block; storing the first data at the first data block; and updating the first logical address to reference the first data block. The second processing may be included in data deduplication processing performed for a first write I/O operation that writes the first data to the first logical address of the first logical device.

In at least one embodiment, processing may include modifying or deleting content stored at the first logical address of the first logical device; and responsive to said modifying or deleting content, performing second processing. The second processing may include decrementing the reference count of the first metadata of the first data block; and updating the result of the first metadata from a first value to a second value. Updating may include determining a first product by multiplying the first value by a modular multiplicative inverse of the first prime number that is assigned to the first logical device; and determining the second value as the first value modulo the maximum prime number. Modifying or deleting content stored at the first logical address of the first logical device may be performed in connection with an I/O operation directed to the first logical address of the first logical device. Modifying or deleting content stored at the first logical address of the first logical device may be performed in connection with an operation that deletes the first logical device. The operation that deletes the first logical device may be a management operation received over a management or control path. The modular multiplicative inverse of the first prime number assigned to the first logical device may be included in a table of computed modular multiplicative inverses for a plurality of prime numbers each less than the maximum prime number. C1 may be determined using a first value selected from a table of computed values, wherein the table includes a plurality of values corresponding to the first prime number, wherein each of the plurality of values may be computed by raising the first prime number to a different integer power greater than 0, and wherein the first value is one of the plurality of values. C1 may be a first precomputed value selected from a table.

BRIEF DESCRIPTION OF THE DRAWINGS

Features and advantages of the present invention will become more apparent from the following detailed description of exemplary embodiments thereof taken in conjunction with the accompanying drawings in which:

FIGS. 5, 6, and 7 are examples of tables of information that may be used in embodiments in accordance with the techniques herein.

DETAILED DESCRIPTION OF EMBODIMENT(S)

Figure 1:
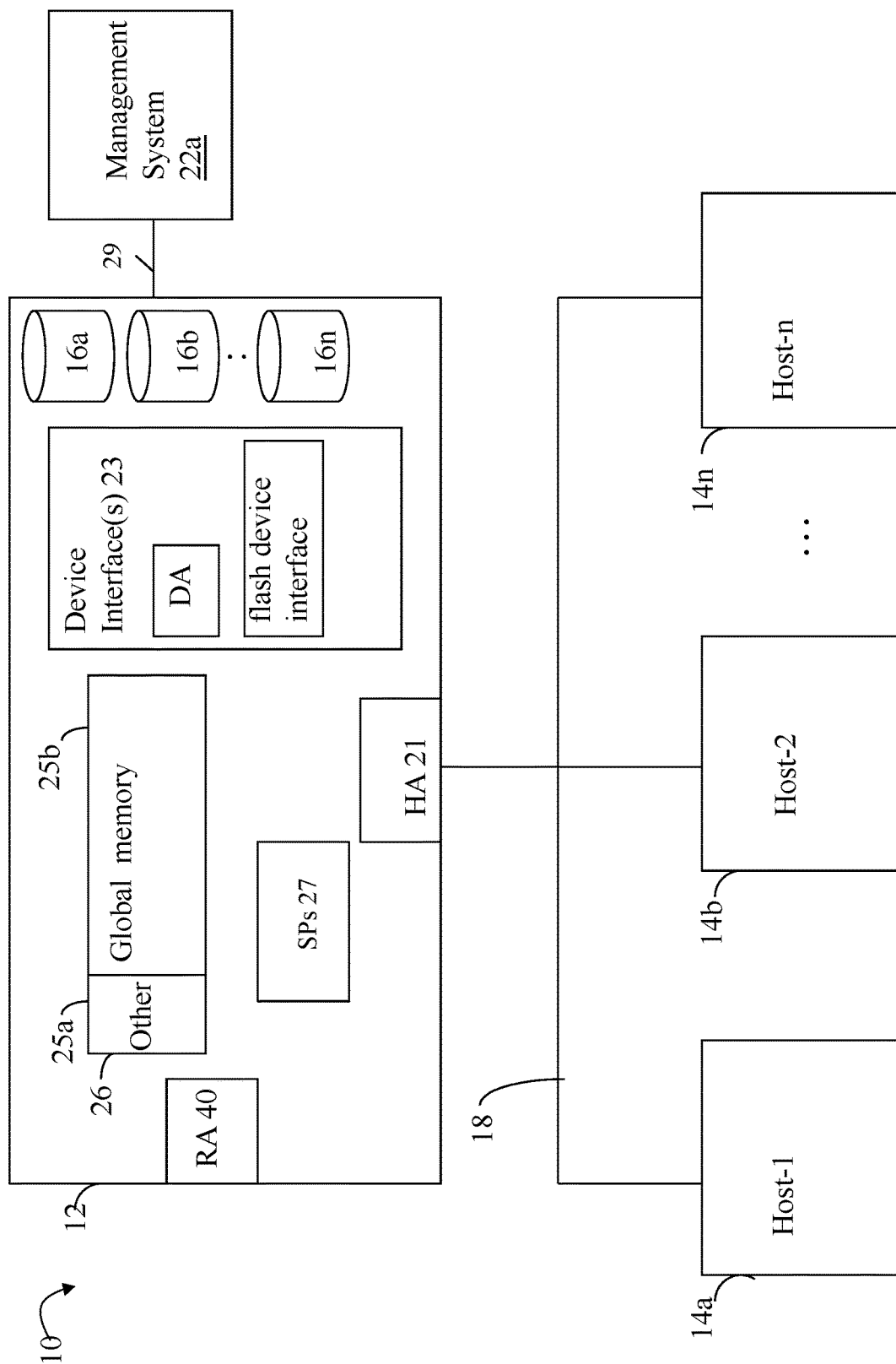
FIGS. 1 and 2B are examples of components that may be included in a system in accordance with the techniques described herein.

Referring to the FIG. 1, shown is an example of an embodiment of a system 10 that may be used in connection with performing the techniques described herein. The system 10 includes a data storage system 12 connected to the host systems (also sometimes referred to as hosts) 14a-14n through the communication medium 18. In this embodiment of the system 10, the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host systems 14a-14n and data storage system 12 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the hosts 14a-14n and the data storage system 12 may all be located at the same physical site, or, alternatively, may also be located in different physical locations. The communication medium 18 used for communication between the host systems 14a-14n and the data storage system 12 of the system 10 may use a variety of different communication protocols such as block-based protocols (e.g., SCSI, Fibre Channel, iSCSI), file system-based protocols (e.g., NFS), and the like. Some or all of the connections by which the hosts 14a-14n and the data storage system 12 may be connected to the communication medium 18 may pass through other communication devices, such switching equipment that may exist such as a phone line, a repeater, a multiplexer or even a satellite.

Each of the host systems 14a-14n may perform data operations. In the embodiment of the FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment may include data storage arrays or other components from one or more vendors. In subsequent examples illustrating the techniques herein, reference may be made to a single data storage array by a vendor. However, as will be appreciated by those skilled in the art, the techniques herein are applicable for use with other data storage arrays by other vendors and with other components than as described herein for purposes of example.

The data storage system 12 may be a data storage appliance or a data storage array including a plurality of data storage devices (PDs) 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. SSDs may refer to solid state electronics devices as distinguished from electromechanical devices, such as hard drives, having moving parts. Flash devices or flash memory-based SSDs are one type of SSD that contains no moving mechanical parts. The flash devices may be constructed using nonvolatile semiconductor NAND flash memory. The flash devices may include, for example, one or more SLC (single level cell) devices and/or MLC (multi level cell) devices.

The data storage array may also include different types of adapters or directors, such as an HA 21 (host adapter), RA 40 (remote adapter), and/or device interface 23. Each of the adapters may be implemented using hardware including a processor with a local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from one of the hosts 14a-n. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a system cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

The host systems 14a-14n provide data and access control information through channels to the storage systems 12, and the storage systems 12 may also provide data to the host systems 14a-n also through the channels. The host systems 14a-n do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of storage space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN (s) residing thereon. A flash device interface may be another type of device interface used in connection with facilitating data transfers to/from the associated flash devices and LUN (s) residing thereon. It should be noted that an embodiment may use the same or a different device interface for one or more different types of devices than as described herein.

In an embodiment in accordance with the techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

It should be noted that although examples of the techniques herein may be made with respect to a physical data storage system and its physical components (e.g., physical hardware for each HA, DA, HA port and the like), the techniques herein may be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a that may be used to manage and monitor the data storage system 12. In one embodiment, the management system 22a may be a computer system which includes data storage system management software or application such as may execute in a web browser. A data storage system manager may, for example, view information about a current data storage configuration such as LUNs, storage pools, and the like, on a user interface (UI) in a display device of the management system 22a. Alternatively, and more generally, the management software may execute on any suitable processor in any suitable system. For example, the data storage system management software may execute on a processor of the data storage system 12.

It should be noted that each of the different adapters, such as HA, DA, RA, and the like, may be implemented as a hardware component including, for example, one or more processors, one or more forms of memory, and the like. Code may be stored in one or more of the memories of the component for performing processing.

The device interface, such as a DA, performs I/O operations on a physical device or drive 16a-16n. In the following description, data residing on a LUN may be accessed by the device interface following a data request in connection with I/O operations. For example, a host may issue an I/O operation which is received by the HA 21. The I/O operation may identify a target location from which data is read from, or written to, depending on whether the I/O operation is, respectively, a read or a write operation request. The target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and logical address or offset location on the LUN, to its corresponding physical storage device (PD) and location on the PD. The DA which services the particular PD may further perform processing to either read data from, or write data to, the corresponding physical device location for the I/O operation.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of the FIG. 1 may be a data storage system, such as a data storage array, that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, the memory 26 may represent memory of each such storage processor.

Generally, techniques herein may be used in connection with any suitable storage system, appliance, device, and the like, in which data is stored. For example, an embodiment may implement techniques herein using a midrange data storage system, such as a Dell EMC Unity® data storage system, as well as a high end or enterprise data storage system, such as a Dell EMC™ PowerMAX™ data storage system.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receiving a response (possibly including requested data) in connection such I/O commands.

The control path, also sometimes referred to as the management path, may be characterized as the path or flow of data management or control commands through a system. For example, the control or management path may be the logical flow through hardware and software components or layers in connection with issuing data storage management command to and/or from a data storage system, and also receiving responses (possibly including requested data) to such control or management commands. For example, with reference to the FIG. 1, the control commands may be issued from data storage management software executing on management system 22*a* to the data storage system 12. Such commands may be, for example, to establish or modify data services, provision storage, perform user account management, and the like. For example, commands may be issued over the control path to provision storage for LUNs, create a snapshot, define conditions of when to create another snapshot, define or establish local and/or remote replication services, define or modify a schedule for snapshot or other data replication services, define a RAID group, obtain data storage management and configuration information for display in a graphical user interface (GUI) of a data storage management program or application, generally modify one or more aspects of a data storage system configuration, list properties and status information regarding LUNs or other storage objects (e.g., physical and/or logical entities in the data storage system), and the like.

The data path and control path define two sets of different logical flow paths. In at least some of the data storage system configurations, at least part of the hardware and network connections used for each of the data path and control path may differ. For example, although both control path and data path may generally use a network for communications, some of the hardware and software used may differ. For example, with reference to the FIG. 1, a data storage system may have a separate physical connection 29 from a management system 22*a* to the data storage system 12 being managed whereby control commands may be issued over such a physical connection 29. However, it may be that user I/O commands are never issued over such a physical connection 29 provided solely for purposes of connecting the management system to the data storage system. In any case, the data path and control path each define two separate logical flow paths.

An embodiment of a data storage system in accordance with techniques herein may perform different data processing operations or services on stored user data. For example, in at least one embodiment in accordance with the techniques herein, a data storage system may provide different data replication technologies, facilities or services. Such replication technologies may be characterized as local or remote. Additionally, a replication technology may provide for creating a complete, physical bit for bit copy or replica of data (that is local and/or remote). A replication technology may provide for creating a logical or virtual point in time copy of a data source such as using a snapshot technology or facility known in the art. Such logical copies of a data source are not a complete physical copy of the data source. Rather, different techniques such as a snapshot technique may be used to create a logical or virtual copy of the data source. For example, a snapshot facility may be used in an embodiment in accordance with techniques herein to create a snapshot characterized as a logical point in time copy of data. In connection with a logical device, or more generally any storage entity, software of a data storage system may provide one or more data replication services or facilities whereby a snapshot is one such facility that may be used to create point in time snapshot of a logical device such as a LUN for non-disruptive backup. A snapshot may appear like a normal logical device and may be used for backup, testing, and the like.

Snapshots may rely, for example, on copy on first write (COFW) and other techniques to track source logical device changes from the time when a snapshot was created. Any writes to the source logical device may result in processing by snapshot software, for example, to copy the original data prior to changes into another area of storage before overwriting the source logical device location with the newly written data (e.g., original data is copied/written to a new location). With respect to COFW techniques, the COFW occurs only once for each data block modified on the source device. Since only changed data blocks of the source device are retained rather than make a complete copy of the source device, the storage capacity required to implement snapshots may be considerably less than that of the source device. Though a snapshot of a source logical device may be presented to a user as a separate logical device along with the current source logical device, a snapshot of the source logical device is a virtual point in time copy and requires access to the unchanged data in the source logical device. Therefore failures affecting the source logical device also affect the snapshot of the source logical device. Snapshots of a source logical device may be contrasted, for example, with the physically complete bit-for-bit replicas of the source logical device.

In connection with the foregoing, COFW is only one example of a technology or a technique that may be used in connection with snapshots. More generally, any suitable technique may be used in connection with snapshot creation and techniques described herein. As another example, redirect on Write (ROW) is another technique that may be used in connection with a snapshot implementation. With ROW, after a snapshot is taken, new writes to the primary or source logical device are redirected (written) to a new location.

An embodiment of a data storage system in accordance with techniques herein may perform one or more data reduction operations, such as data deduplication and/or compression. Such data reduction operations attempt to reduce the amount of storage needed for storing data on non-volatile backend storage devices (e.g., PDs) with the goal of reducing the cost per unit of storage consumed (e.g., dollar cost per GB of storage). Generally, data deduplication and compression techniques are known in the art and any suitable such technique may be used in an embodiment in accordance with techniques herein. In at least one embodiment, the compression technique may be a lossless compression technique such as an algorithm from the Lempel Ziv algorithm family (e.g., LZ77, LZ78, LZW, LZR, and the like). In at least one embodiment in accordance with techniques herein, data deduplication processing performed may include digest or hash value computation using an algorithm such as based on the SHA-256 hashing algorithm known in the art. Data deduplication generally refers to removing redundant or duplicate data portions. Data deduplication techniques may include looking for duplicate data chunks whereby only a single instance of the data chunk is retained (stored on physical storage) and where pointers or references may be used in connection with duplicate or redundant copies (which reference or identify the single stored instance of the data chunk).

Figure 2A:
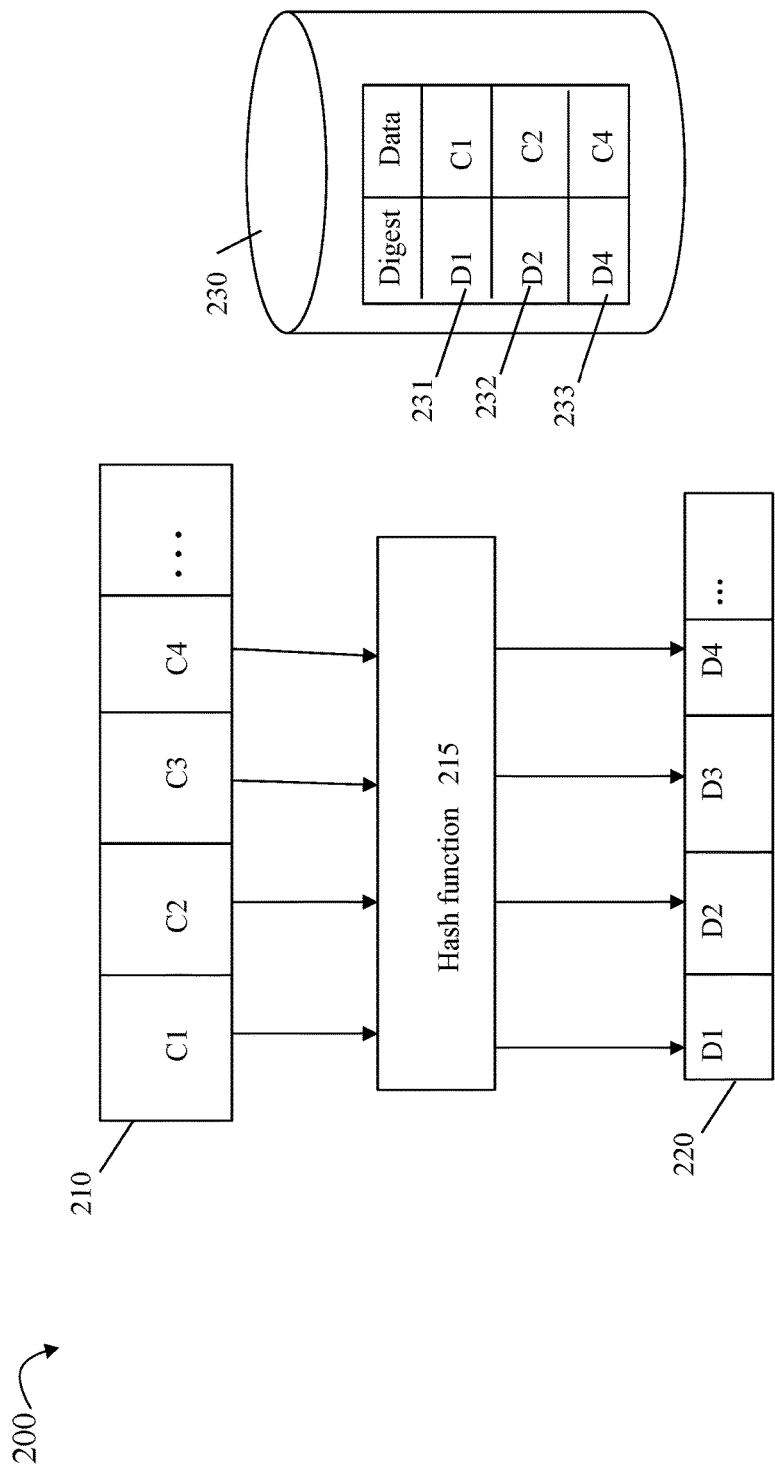
FIG. 2A is an example illustrating data deduplication as may be performed in an embodiment in accordance with the techniques herein.

Referring to the FIG. 2A, shown is an example 200 illustrating processing that may be performed in connection with data deduplication processing in an embodiment in accordance with techniques herein. The element 210 may denote the original data being written or stored on back-end non-volatile storage. The original data may be partitioned into multiple data chunks C1, C2, C3, C4 and the like. In at least one embodiment and for purposes of illustration, the data chunks may all be the same size where the size may vary with embodiment. As a variation depending on the data deduplication technique utilized, the chunks of 210 may be of varying or different sizes. Each chunk is provided as an input to hash function 215. As noted above, in at least one embodiment, the hash function 215 may be the SHA-256 hashing algorithm, or more generally, any suitable cryptographic, or non-cryptographic hashing function known in the art. For each chunk of 210, the hash function 215 may perform processing and generate, as an output, a hash value or digest. The element 220 includes digests D1, D2, D3, D4, and the like, where a corresponding different one of the digests DN is generated for one of the chunks CN (where "N" is an integer denoting the chunk and associated digest generated for that chunk). For example, D1 is the digest generated for C1, D2 is the digest generated for C2, D3 is the digest generated for C3, and so on. Generally, a hash function 215 is selected which has an acceptably low probability of a "hash collision" of generating the same digest or hash value for two different chunks. The strength of the hash function 215 may be measured by the unlikelihood of a collision occurring two different input chunks of data produce the same digest. The strength increases with the bit length of the hash value or digest. Thus, if two chunks, such as C1 and C3, have the same digests whereby D1=D3, then chunks C1 and C3 match (e.g., are identical matching data chunks). If two chunks, such as C1 and C4, have different digests whereby D1 does not equal D4, then chunks C1 and C4 do not match (e.g., are different or non-matching data chunks). In cases where two matching or identical chunks have the same digest, only a single copy of the data chunk is stored on backend non-volatile physical storage of the data storage system. The single stored instance of the data chunk may be referenced using a pointer, handle, the digest of the chunk, and the like.

The element 230 of the FIG. 2A may denote the data store used to store data chunks. In this example, as noted above, assume chunks C1 and C3 are the same with remaining chunks C2 and C4 being unique. In at least one embodiment, element 230 may be organized and managed using a data structure, such as a hash table. In at least one embodiment, computed digests, or portions thereof, may be used as an index into the hash table where the single unique instances of data chunks may be stored (along with other metadata as may be needed for maintaining the table and also in accordance with the particular hash table management used in an embodiment). Hash tables are data structures known in the art. A hash table uses a hash function to compute an index into an array of buckets or slots, from which the desired data can be found. In this example, the chunk of data may be mapped by hash function 215, and thus by the chunk's digest, to a particular entry in the table at which the chunk of data is stored. To further illustrate, the hash function 215 may be used to generate a digest for a particular data chunk. The digest is then further mapped (e.g., such as by another mathematical function, using particular portions of the digest, and the like) to a particular index or entry of the hash table. The particular mapping used to map the digest to a corresponding table entry varies, for example, with the digest and the size of hash table.

When storing a new data chunk, such as C1, its digest may be mapped to a particular hash table entry 231 whereby if the table entry is null/empty, or otherwise does not already include a data chunk matching C1, then C1 is stored in the table entry along with its associated digest D1 (this is the first time chunk C1 is recorded in the data store 230). Otherwise, if there is already an existing entry in the table including a data chunk matching C1, it indicates that the new data chunk is a duplicate of an existing chunk. In this example as noted above, processing is performed for C1, C2, and C4 respectively, where entries 231, 232, and 233 are added since there are no existing matching entries in the hash table. When processing chunk C3, as noted above, C3 has a digest D3 matching D1 whereby C3 (and thus D3) maps to entry 231 of the hash table already including a matching chunk C1 (so no additional data chunk is added to 230 for C3 since C3 is determined as a duplicate of C1). In connection with representing a particular file or other storage entity including multiple duplicate occurrences of a particular chunk such as C3, the single instance or copy of the data may be stored in 230. Additionally, a handle or reference, such as identifying the hash table entry 231, its digest, and the like, may be used to reference the single instance or copy of the data storage in 230. When reconstructing or restoring data to its original form, the handle or reference into the hash table for chunk C3 may be used to obtain the actual C3 chunk of data from 230.

Figure 2B:
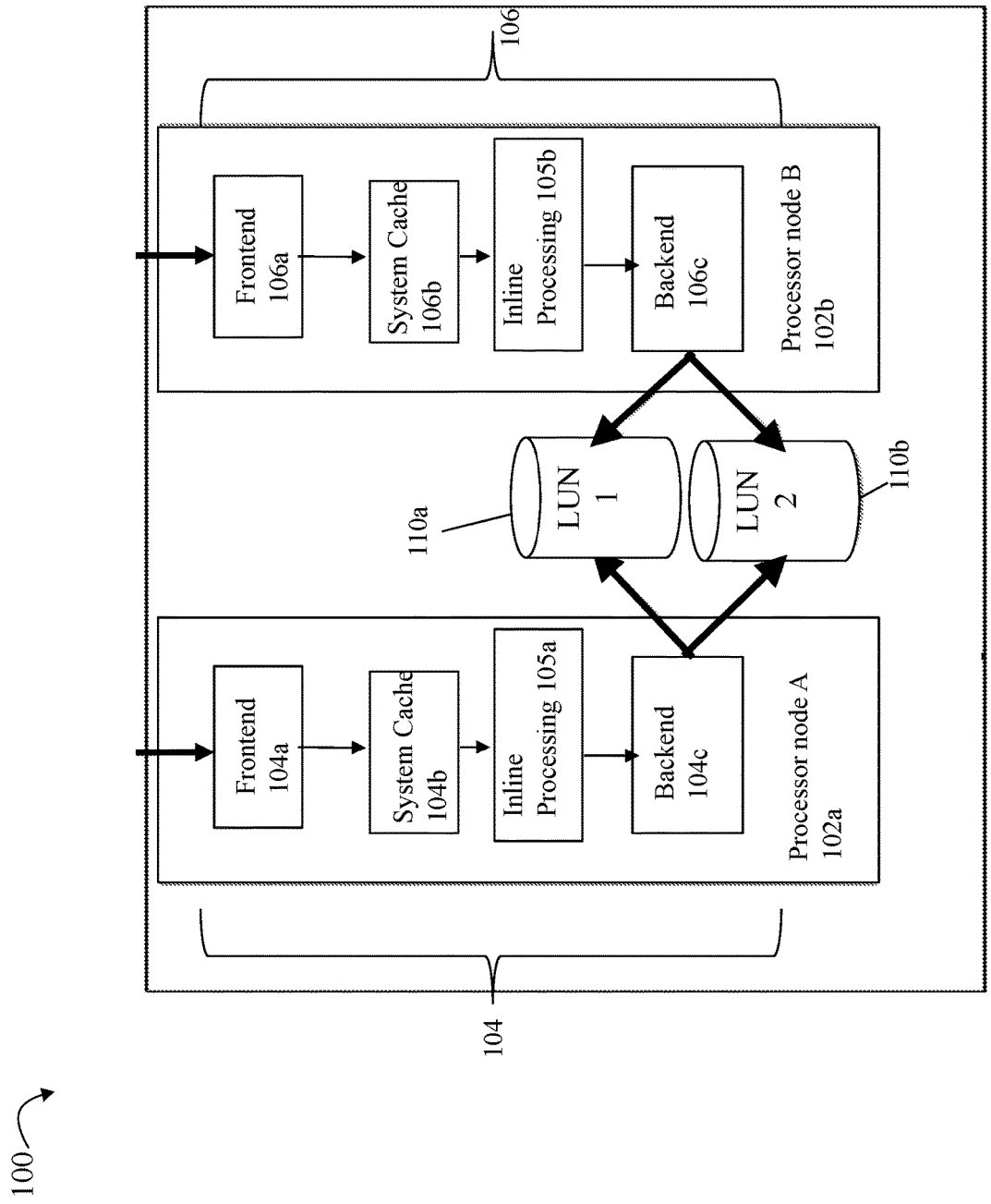

With reference to the FIG. 2B, shown is an example 100 illustrating components that may be included in the data path in at least one existing data storage system in accordance with the techniques herein. The example 100 includes two processor nodes A 102a and B 102b and associated software stacks 104, 106 of the data path where I/O requests may be received by either processor node 102a or 102b. In the example 200, the data path 104 of processor node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and permanent non-volatile storage (e.g., back end physical non-volatile storage devices accessed by BE components such as DAs as described herein). During movement of data in and out of the system cache layer 104b (e.g., such as in connection with read and writing data respectively, to physical storage 110a, 110b), inline processing may be performed by layer 105a. Such inline processing operations of 105a may be optionally performed and may include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing may include performing compression and data duplication. Although in following paragraphs reference may be made to inline processing including compression and data deduplication, more generally, the inline processing may include performing any suitable or desirable data processing operations as part of the I/O or data path (e.g., where such operations may include any of compression and data deduplication, as well as any other suitable data processing operation).

In a manner similar to that as described for data path 104, the data path 106 for processor node B 102b has its own FE component 106a, system cache layer 106b, inline processing layer 105b, and BE component 106c that are respectively similar to components 104a, 104b, 105a and 104c. The elements 110a, 110b denote physical storage provisioned for LUNs whereby an I/O may be directed to a location or logical address to read data from, or write data to, the logical address. The LUNs 110a, 110b are examples of storage objects representing logical storage entities included in an existing data storage system configuration. Since, in this example, writes directed to LUNs 110a, 110b may be received for processing by either of the nodes 102a and 102b, the example 100 illustrates what may also be referred to as an active-active configuration.

In connection with a write operation as may be received from a host and processed by processor node A 102a, the write data may be written to the system cache 104b, marked as write pending (WP) denoting it needs to be written to physical storage 110a, 110b and, at a later point in time, the write data may be destaged or flushed from the system cache to the physical storage 110a, 110b by the BE component 104c. The write request may be considered complete once the write data has been stored in the system cache whereby an acknowledgement regarding the completion may be returned to the host (e.g., by component 104a). At various points in time, the WP data stored in the system cache is flushed or written out to the physical storage 110a, 110b. In connection with the inline processing layer 105a, prior to storing the original data on the physical storage 110a, 110b, compression and data deduplication processing may be performed that converts the original data (as stored in the system cache prior to inline processing) to a resulting form (that may include compressed and/or deduplicated portions) which is then written to physical storage 110a, 110b. In at least one embodiment, when deduplication processing determines that a portion (such as a chunk) of the original data is a duplicate of an existing data portion already stored on 110a, 110b, that particular portion of the original data is not stored in a compressed form and may rather be stored in its deduplicated form (e.g., there is no need for compression of a chunk determined to be duplicate of another existing chunk). If the original data portion is not a duplicate of an existing portion already stored on 110a, 110b, the original data portion may be compressed and stored in its compressed form on 110a, 110b.

In connection with a read operation to read a chunk of data, a determination is made as to whether the requested read data chunk is stored in its original form (in system cache 104b or on physical storage 110a, 110b), or whether the requested read data chunk was previously deduplicated or compressed. If the requested read data chunk (which is stored in its original decompressed, non-deduplicated form) is in the system cache, the read data chunk is retrieved from the system cache 104b and returned to the host. Otherwise, if the requested read data chunk is not in the system cache 104b but is stored on the physical storage 110a, 110b in its original form, the requested data chunk is read by the BE component 104c from the backend storage 110a, 110b, stored in the system cache and then returned to the host. If the requested read data chunk was previously deduplicated, the read data chunk is recreated and stored in the system cache in its original form so that it can be returned to the host. If the requested read data chunk was previously compressed, the chunk is first decompressed prior to sending the read data chunk to the host. If the compressed read data chunk is already stored in the system cache, the data is uncompressed to a temporary or buffer location, the uncompressed data is sent to the host, and the buffer or temporary location is released. If the compressed read data chunk is not in the system cache but stored on the physical storage 110a, 110b, the compressed read data chunk may be read from the physical storage 110a, 110b into the system cache, uncompressed to a buffer or temporary location, and then returned to the host. Thus, requested read data stored on physical storage 110a, 110b may be stored in a deduplicated or compressed form as noted above where processing is performed by 105a to restore or convert the deduplicated or compressed form of the data to its original data form prior to returning the requested read data to the host.

In at least one embodiment, the techniques herein may be used with data deduplication processing performed inline as part of the I/O or data path, as described above in connection with ILC and ILD processing. However, it should be noted that the techniques herein are more generally applicable for use in deduplication performed which is not inline or not part of the I/O or data path, such when processing a data set offline or in the background.

As discussed above, deduplication is data reduction technique that may be performed as a data service for data blocks stored on back-end PDs in a data storage system. With deduplication, multiple blocks that are exactly the same (e.g., same or matching data content) are represented using a single physical data block. For example and with reference is made to FIG. 3, the same data block (DB) 1 may be stored on LUN 1 310 at 3 different logical addresses L1, L2 and L3; and may also be stored on LUN 2 312 at one logical address L4. Deduplication of both LUN 1 and LUN 2 may result in a single physical copy of the DB1 stored in allocated physical storage 302 where the different logical addresses L1, L2 and L3 of LUN 1 and L4 of LUN 2 reference, or point to (directly or indirectly) the single copy of DB1.

Benefits or gains in data reduction increase as the number of times the same DB1 appears in one or more LUNs. However, storage capacity reclamation of physical storage, such as following deletion of a LUN, may be more complex and difficult in deduplication environments. Deletion of a LUN or logical device, or more generally deletion of data within a logical address space, does not mean that the physical storage associated with such deleted data may be reclaimed. In a system using data deduplication, the physical storage may be reclaimed only if the deleted data is uniquely referenced by the deleted logical address space data and not otherwise referenced by another logical address having content that is not deleted. For example, reference is made again to FIG. 3. Assume that LUN 2 312 is deleted. The physical storage associated with DB1 stored at physical storage location 302 cannot be reclaimed since DB1 is also referenced by multiple logical addresses L1, L2 and L3 of LUN 1 310. Deletion of a logical device such as LUN 1 does not guarantee that even a single physical block of storage which is uniquely referenced will be reclaimed. As a result, deleting a LUN, or more generally, performing an operation the deletes content stored at one or more logical addresses does not guarantee any physical storage will be reclaimable for reuse.

Storage systems may use various algorithms or heuristics for predicting the capacity or physical storage reclamation that may be achieved as a result of deleting one or more specified LUNs. Such algorithms used for determining the amount of capacity or physical storage that would be achieved by deleting one or more LUNs may generally be partitioned into two categories—statistical estimation and exact or actual per block calculations. Statistical estimation is generally considered less accurate relative to other algorithms that perform an exact or actual per block calculation. However, the amount of metadata (MD) generally needed to perform a more exact or actual per block calculation typically far exceeds the amount of MD needed for statistical estimation techniques.

Described herein are techniques that may be used in connection with determining whether a particular DB is uniquely or solely referenced by a particular single LUN. Such techniques use a relatively small amount of additional MD. In at least one embodiment, for each DB, a reference count may already be maintained and used in connection with deduplication. Using the techniques herein, an additional MD item may be maintained per DB. The size of the additional MD item may be of a selected suitable size that may vary with embodiment depending on what is an acceptable level of occurrence of a false positive (e.g., where a determination is incorrectly made that a particular DB will be reclaimed as a result of deleting a particular LUN when the DB will not actually be reclaimed as a result of deleting the particular LUN). The selected size, in terms of a number of bits, of the additional MD item maintained per DB affects the rate of a false positive determination of exclusive DB ownership by a single specific LUN. Generally, the higher the number of bits used for the additional MD item, the lower the false positive rate or ratio. In following paragraphs, the additional MD item may be referred to as the result stored with each DB.

The techniques described in the following paragraphs utilize the modular multiplicative inverse (MMI) of a different unique prime number assigned to each LUN. A revised value for the result of a DB may be determined when the reference count associated with the DB is updated. In at least one embodiment, if the reference count is increased due to a logical address of a LUN referencing the DB as content stored at the logical address, the result is multiplied by the unique prime number assigned to the LUN. If the reference count is decreased due to content stored at a logical address of a LUN being modified or deleted, the result is multiplied by the MMI of the unique prime number assigned to the LUN. A determination of whether a particular LUN is a sole or unique owner of the DB may be made using the identified by the particular unique prime number assigned to the LUN, the current reference count of the DB and the current result of the DB. Additionally, the size of the result, and thus the estimated false positive rate, may be determined in accordance with the number of LUNs to which the techniques herein are applied and also in accordance a selected maximum prime number, PRIMEMAX.

The foregoing and other aspects of the techniques herein are described in more detail in the following paragraphs.

The MMI of a prime number Pi may also be referenced herein as MMI (Pi) or as $Pi^{-1}$. The MMI(Pi) with respect to a unique prime number Pi assigned to a LUN is a value wherein the following equality of EQUATION A1 holds or is true:

$$(Pi * \text{MMI}(Pi)) \% \ \text{PRIMEMAX} = 1 \qquad \text{EQUATION A1}$$

wherein:

Pi is the unique prime number assigned to the LUN;

PRIMEMAX denotes the maximum or largest prime number assigned or assignable to a LUN; and % denotes the mathematical modulus (MOD) operation.

The MOD or % operation finds the remainder after dividing one number by another. Given two positive numbers, X and Y, X modulo Y (abbreviated as X MOD Y or X % Y) is the remainder of the Euclidean division of X by Y, where X is the dividend and Y is the divisor. The MMI of X MOD Y exists if and only if X and Y are relatively prime or coprime where the GCD (greatest common denominator) of X and Y is 1 (e.g., GCD(X,Y)=1). The MMI may be calculated using any suitable technique. For example, different mathematical libraries, functions or routines may be utilized which calculate the MMI (Pi). In at least one embodiment, MMI (Pi) may be determined using the Extended Euclidian Algorithm or the Basic Euclidian Algorithm both known in the art.

In connection with performing the techniques herein, each LUN is assigned a unique prime number less than PRIMEMAX. A prime number (or a prime) is a natural number greater than 1 that cannot be formed by multiplying two smaller natural numbers. To illustrate the techniques herein, particular values are selected, such as for PRIMEMAX, for simplification. However, generally, the techniques herein are not limited to the particular values or examples presented herein for illustration.

In at least one embodiment having snapshots of LUNs, the unique prime number may be assigned to the source LUN and its one or more snapshots. For simplicity of illustration, following paragraphs assign a unique prime number per LUN.

For example, PRIMEMAX may be selected as 17 where the group of unique prime numbers that can be assigned to LUNs are (2, 3, 5, 7, 11 and 13). Thus, in our example, there may be at most 6 LUNs since each is assigned a different prime number. With reference back to FIG. 3, assume that there are 2 LUNs, LUN 1 310 and LUN 2 312 where LUN 1 is assigned the prime number 2, and LUN 2 is assigned the prime number 11.

Each DB, such as DB1, has associated MD 320 including a reference count 322 and a result 324. Values for 322 and 324 are updated each time an additional reference is made to the DB such as in connection with deduplication. Initially, the reference count is 0 and the result 324 is 1. In particular, each time there is an additional reference to DB1, reference count 322 is incremented by 1. Additionally, each time there is an additional reference to DB1, the result 324 is updated as expressed in EQUATION A2 below:

$$\text{Result} = (\text{Result} * Pi) \% \ \text{PRIMEMAX} \qquad \text{EQUATION A2}$$

where

Result on the right hand side of EQUATION A2 is the current value of Result;

Result on the left hand side of EQUATION A2 is the updated or revised value of Result; and Pi is the prime number assigned to the LUN having a logical address in its logical address space that references DB1 (e.g., where the contents of DB1 are stored at the logical address on the LUN).

Each time a reference to DB1 is removed, such as where the content or data stored at the LUN's logical address that references DB1 is updated, the reference count is decreased by 1. Additionally, each time a reference to DB is removed, the result 324 is updated as expressed in EQUATION A3 below:

$$Result=(Result*MMI(Pi))\% \; PRIMEMAX \qquad EQUATION \; A3$$

where

Result on the right hand side of EQUATION A3 is the current value of Result;

Result on the left hand side of EQUATION A3 is the updated or revised value of Result;

Pi is the prime number assigned to the LUN having a logical address in its logical address space whose reference to DB1 is removed (e.g., where the contents of DB1 are no longer stored at the logical address on the LUN); and MMI (Pi) is the modular multiplicative inverse of Pi, as described above.

Figure 3:
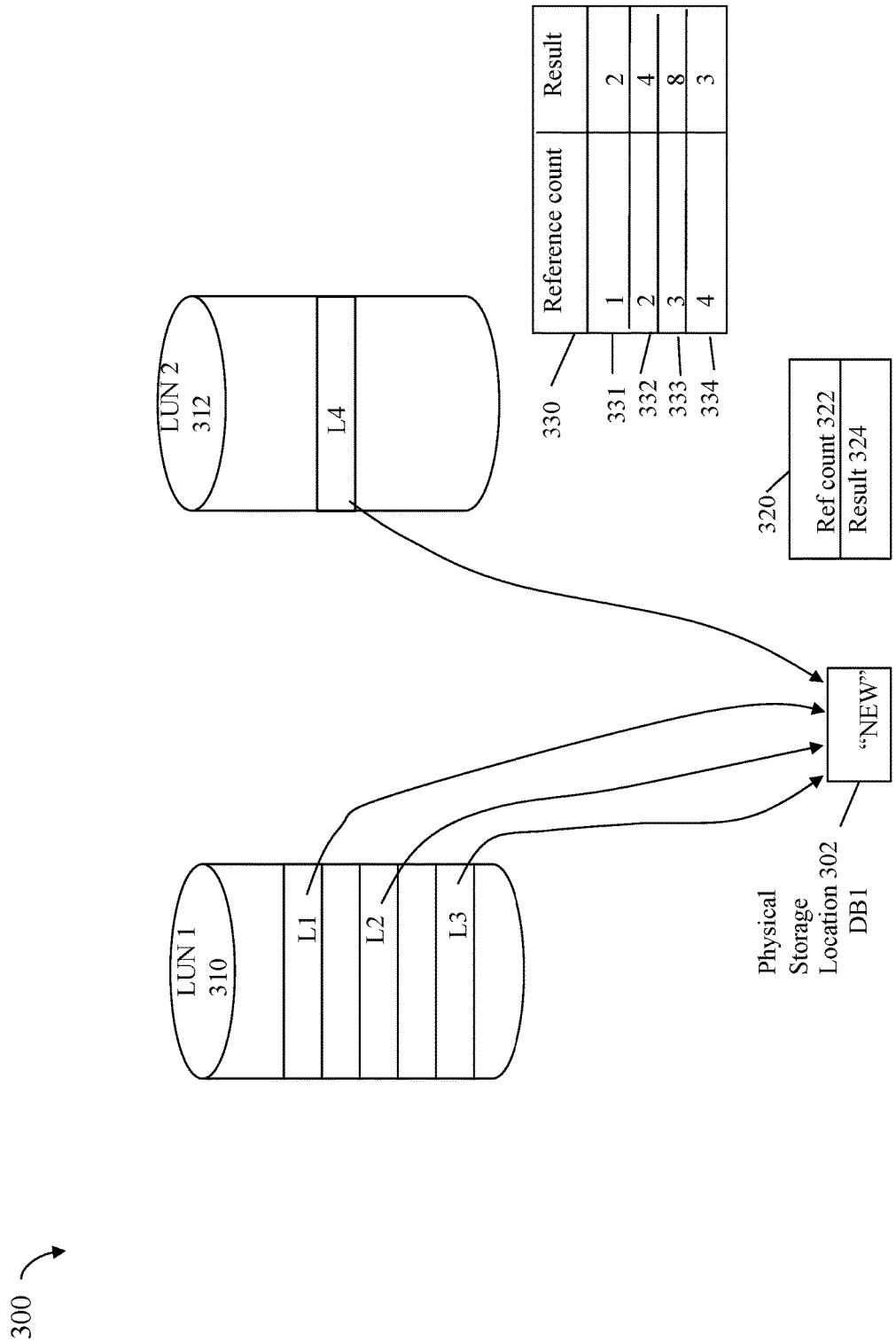
FIGS. 3 and 4 are examples illustrating use of the techniques herein in connection with determining whether a data block is uniquely owned by a logical device.

Consider the example 300 of FIG. 3 prior to any writes to LUNs 310 and 312. The table 330 includes calculated values for the MD items reference count and result as each additional reference to DB1 is made. At a first point in time, there is a write to L1 of LUN 1 310 which initially writes the content "NEW" to DB1. Processing determines that this write of the content "NEW" is a unique data block and that there is currently no existing DB having the content "NEW". At this first point in time, processing is performed to allocated storage for DB1 and store the contents "NEW" at the location 302. Also at this first point in time, processing also updates the reference count to 1 and updates the result to be 2 as denoted by row 331. The result=2 in row 331 may be determined using EQUATION A2.

At a second point in time, there is a second write to L2 of LUN 1 310 which also writes "NEW". Deduplication processing determines that the contents written to L2 matches existing DB1 already stored at location 302. As such, L2 is mapped to the DB1 stored at location 302. Also at this second point in time, processing updates the reference count to 2 and updates the result to be 4 as denoted by row 332. The result=4 in row 332 may be determined using EQUATION A2.

At a third point in time, there is a third write to L3 of LUN 1 310 which also writes "NEW". Deduplication processing determines that the contents written to L3 matches existing DB1 already stored at location 302. As such, L3 is mapped to the DB1 stored at location 302. Also at this third point in time, processing updates the reference count to 3 and updates the result to be 8 as denoted by row 333. The result=8 in row 333 may be determined using EQUATION A2.

Processing may be performed at this third point time after the third write to also determine whether DB1 is currently uniquely owned or only uniquely referenced by only a single LUN, and if so, identify that particular LUN. In connection with the techniques herein, processing may be performed to determine, for each LUN assigned a different Pi, is the LUN the unique single owner of DB1 using the current value of reference count and Pi. To determine whether the LUN assigned Pi is the unique single owner of DB1, the following calculation may be performed to determine the value C1:

$$C1=Pi^{Ref}\% \; PRIMEMAX \qquad EQUATION \; A4$$

where

Pi is the Pi assigned to the LUN for which processing is performed to determine whether the LUN is the unique and only owner referencing DB1; and C1 is the calculated value denoting the expected value for result if the LUN assigned Pi is the unique and only owner reference DB1;

Ref is the current value of reference count for DB1; and $Pi^{Ref}$ denotes Pi raised to the exponential power of Ref.

Generally, EQUATION A4 determines a first value by raising Pi to the exponential power of the reference count, and then determines the first value MOD PRIMEMAX.

At this third point in time, the reference count is 3 and the current value of result is 8 as denoted by row 333. C1 may be computed then for LUN 1 310 assigned Pi=2 using EQUATION A4 where C1 is computed as 8 (e.g., $2^3$=8, for reference count of 3). In accordance with the techniques herein, if C1 is equal to the current value of result in row 333, then LUN 1 310 assigned Pi=2 is determined as the sole unique owner of DB1. Otherwise, the LUN 1 310 assigned Pi=2 is not determined as the sole unique owner of DB1. In this example, processing determines that LUN 1 310 assigned Pi=2 is the current sole unique owner of DB1 since C1=8 and the current value of result=8 (as indicated in the second column of row 333 of the table 330).

Now, at a fourth point in time, there is a fourth write to L4 of LUN 2 312 which also writes "NEW". Deduplication processing determines that the contents written to L4 matches existing DB1 already stored at location 302. As such, L4 is mapped to the DB1 stored at location 302. Also at this fourth point in time, processing updates the reference count to 4 and updates the result to be 3 as denoted by row 334. The result=3 in row 334 may be determined using EQUATION A3.

Processing may be performed at this fourth point time after the fourth write to also determine whether DB1 is currently uniquely owned or only uniquely referenced by only a single LUN, and if so, identify that particular LUN. In connection with the techniques herein, processing may be performed to determine, for each LUN assigned a different Pi, is the LUN the unique single owner of DB1 using the current value of reference count and Pi.

At this fourth point in time, the reference count is 4 and the current value of result is 4 as denoted by row 334. At this fourth point in time, C1 may be computed for LUN 1 310 assigned Pi=2 using EQUATION A4 where C1 is computed as 16 (e.g., $2^4$% 17=16, for reference count of 4). In accordance with the techniques herein, if C1 is equal to the current value of result in row 334, then LUN 1 310 assigned Pi=2 is determined as the sole unique owner of DB1. Otherwise, the LUN 1 310 assigned Pi=2 is not determined as the sole unique owner of DB1. In this example, processing determines that LUN 1 310 assigned Pi=2 is not the current sole unique owner of DB1 since C1=16 and the current value of result=3 (as indicated in the second column of row 334 of the table 330).

Since LUN 1 310 is not the sole unique owner of DB1, processing then continues at this fourth point in time to compute C1 for LUN 2 312 assigned Pi=3 using EQUATION A4 where C1 is computed as 4 (e.g., $11^4$=14,641% 17=4, for reference count of 4). In accordance with the techniques herein, if C1 is equal to the current value of result in row 334, then LUN 2 312 assigned Pi=11 is determined as the sole unique owner of DB1. Otherwise, the LUN 2 312 assigned Pi=11 is not determined as the sole unique owner of DB1. In this example, processing determines that LUN 2 312 assigned Pi=11 is not the current sole unique owner of DB1 since C1=4 and the current value of result=3 (as indicated in the second column of row 334 of the table 330).

Thus, processing at the fourth point in time determines, using EQUATION A4, that DB1 is not uniquely owned by any of the LUNs 310, 312. In this example, if there were other LUNs assigned other unique prime numbers, processing may be performed in a similar manner as described above using EQUATION A4 for such other LUNs to determine whether any of the other LUNs is the current sole unique owner of DB1.

Figure 4:
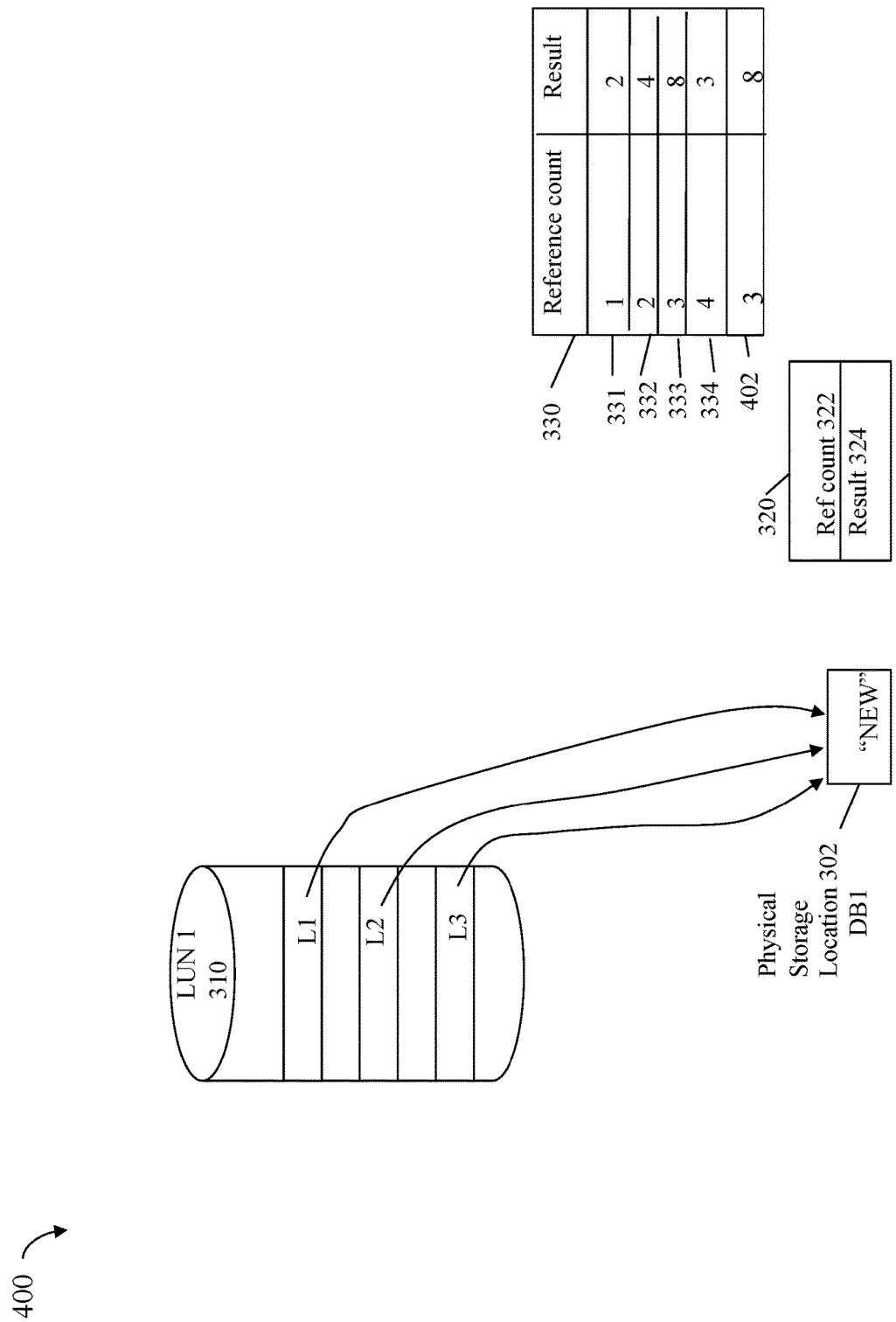

Now, at a fifth point in time, assume that LUN 2 312 is deleted as illustrated in the FIG. 4. At this fifth point in time, the reference count is decremented by 1 to 3 as noted by row 402 of the revised table 330. Also, the result is recalculated using EQUATION A3 and updated to be 8 as denoted by row 402. In connection with EQUATION A3, the MMI(Pi=11) =14.

Processing may be performed at this fifth point time after LUN 2 312 is deleted to also determine whether DB1 is currently uniquely owned or only uniquely referenced by only a single LUN, and if so, identify that particular LUN. In connection with the techniques herein, processing may be performed to determine, for each LUN assigned a different Pi, is the LUN the unique single owner of DB1 using the current value of reference count and Pi.

At this fifth point in time, the reference count is 3 and the current value of result is 8 as denoted by row 402. At this fifth point in time, C1 may be computed for LUN 1 310 assigned Pi=2 using EQUATION A4 where C1 is computed as 8 (e.g., $2^3$ % 17=16, for reference count of 3). In accordance with the techniques herein, if C1 is equal to the current value of result in row 402, then LUN 1 310 assigned Pi=2 is determined as the sole unique owner of DB1. Otherwise, the LUN 1 310 assigned Pi=2 is not determined as the sole unique owner of DB1. In this example, processing determines that LUN 1 310 assigned Pi=2 is the current sole unique owner of DB1 since C1=8 and the current value of result=8 (as indicated in the second column of row 402 of the table 330 in FIG. 4).

In at least one embodiment, all of the values used in connection with the equations described herein may be performed at runtime. In at least one embodiment, at least some of the values used in connection with the equations described herein may be precomputed and stored in one or more tables as described below in more detail.

In at least one embodiment in accordance with the techniques herein, a table of precalculated C1 values determined using EQUATION A4 may be used in determining whether any LUN having one of the unique assigned prime numbers Pi is currently the sole unique owner of a DB. Reference is made to FIG. 5 illustrating an example 500 of a table that may be used in an embodiment in accordance with the techniques herein. The table 500 may include cells or entries that are different C1 values calculated using EQUATION A4 for a particular reference count and Pi value. The table 500 includes a different row for each different Pi or prime number assignable or that may be assigned to a LUN. In this example, the possible Pi values are 2, 3, 5, 7, 11 and 13 as denoted by 502 in FIG. 5 whereby the table 500 includes 6 rows, one for each Pi values. Generally, there may be mapping between each Pi value of 502 and each different row as denoted by 506. Thus elements 506 and 502 denote the mapping of Pi values to row numbers 506 for the table 500. Assuming one-based indices, Pi=2 maps to row 1, Pi=3 maps to row 2, Pi=5 maps to row 3, Pi=7 maps to row 4, Pi=11 maps to row 5, and Pi=13 maps to row 6. An entry of the table mapping to a particular reference count and Pi includes the C1 value calculated using EQUATION A4 using such values. For example, row 1 for Pi=2 with reference count=4 has a value of 16 computed using EQUATION A4. The reference count may be used an index for the column number. As noted above, each of the entries or cells in the table 500 are computed using EQUATION A4 (e.g., $C1 = Pi^{Ref}$ % PRIMEMAX) for the example herein where PRIMEMAX=17.

In this manner, when performing processing to determine values of C1 for different reference counts, a single column of the table may be used. For example, when performing processing as described above at the fourth point in time where the reference count is 4, column 4 of the table 500 may be used where each of the values of 510 may be compared to the current value of result for the DB1 at the fourth point in time to determine whether any of the LUNs is the unique sole owner of the DB1. For example, assuming that each of the Pi's of 502 is assigned to a different LUN, each of the values of 510 may be compared to 3, the current value for result (e.g., second column of the row 334). If there is a match between the current value for result and one of the C1 values of 510, where the matching C1 value is included in a row for a particular Pi, then processing may determine that the LUN assigned the particular Pi is the sole unique owner of the DB1. Otherwise if no entry in the column corresponding to the reference count matches the current value for result, then it is determined that none of the LUNs is the unique sole owner of the DB1. In a similar, manner, when determining whether any LUN is the single unique owner of the DB1 at the fifth point in time where reference count is 3, column 3 of the table 500 may be used to determine whether any LUN is the sole unique owner of the DB1.

In connection with column 4 for reference count 4, it should be noted that two of the values for Pi=7 and Pi=11 are both 4. This means that when determining whether a LUN having a particular Pi is the unique sole owner of a data block with reference count=4, 2 LUNs may be identified. This is what is described herein as a false positive occurrence where in actuality only one of the Pi values and associated LUN is actually the unique sole owner of the data block. The incorrect LUN may be identified as the unique sole owner. In at least one embodiment, processing may stop at the first match between the current value for result and an entry including a C1 value in a column of the table 500, whereby the Pi associated with the matching entry of the column of the table 500 may be determined as the Pi assigned to the LUN that is the unique sole owner of the data block.

An embodiment in accordance with the techniques herein may store such precomputed values in the table 500 for any desired reference count values. In at least one embodiment, the table may include reference counts for a consecutive contiguous integer range of reference counts beginning with 1 as illustrated in FIG. 5 up to a specified maximum number. Use of such precomputed values may reduce the overall processor time needed.

As a variation, rather than store precomputed values for C1 determined using EQUATION A4 as in FIG. 5, an embodiment may store precomputed values for $Pi^{Ref}$ as used in connection with computing the C1 values of EQUATION A4. For example, reference is made to the FIG. 6 in which precomputed values may be stored in entries or cells of the matrix for different $Pi^{Ref}$ values computing using different reference counts (Ref values) and different Pi values. The row and column indices of the matrix of the FIG. 6 are as described in connection with the FIG. 5. However, the table 600 of FIG. 6 includes entries which are precalculated values for $Pi^{Ref}$. In this manner, the values from the table 600 may be used in computing the C1 values of EQUATION A4 where the value for PRIMEMAX may vary. In at least one embodiment, the table 600 may include entries for consecutive reference count values from 1 through a specified maximum as described above in connection with the FIG. 5.

As a variation, an embodiment may use an instance of the table 600 of precomputed values for $Pi^{Ref}$ where there is a spacing between reference count values in the table. For example, an embodiment may choose to store precomputed values for $Pi^{Ref}$ for reference counts 1 through N (e.g., N=50) and then may store $Pi^{Ref}$ values for reference counts spaced 5 apart (e.g., 55, 60, 65, 70, etc.). If a reference count is needed for which a column is not explicitly provided in the table, another column associated with the closest preceding reference count or closest subsequent reference count may be used. For example, assume the table included a column with precomputed values for $Pi^{Ref}$ for reference counts=55 and 60 and a column of $Pi^{Ref}$ values are needed for reference count=56. In this manner, the column of precomputed values for the reference count of 55 may be used to compute, at runtime, values for a reference count of 56 by multiplying each precomputed value in the column for reference count=55 by its corresponding Pi value. For example, $2^{55}=3.6028797e+16$ is stored as the value for $Pi^{Ref}$ in the column for reference count=55, Pi=2. The value 3.6028797e+16 stored at entry (1, 55) may be multiplied by 2 to obtain the value for $2^{56}$, where reference count=56. Generally, an embodiment may choose any suitable spacing between successively stored reference counts for which precomputed values for $Pi^{Ref}$ are stored in the table 600.

It should be noted that although the tables of FIGS. 5 and 6 have reference count values as the column indices and Pi values mapped to row indices, an embodiment may also have reference count values as the row indices and may map Pi values to column indices.

Referring to FIG. 7, shown is a table 700 of Pi values and MMI (Pi) or $Pi^{-1}$ values that may be used in an embodiment in accordance with the techniques herein. The table 700 includes MMI (Pi) or $Pi^{-1}$ values consistent with discussion herein for PRIMEMAX=17 based on EQUATION A1. The MMI (Pi) or $Pi^{-1}$ values in the second column of the table 700 may be used in performing calculations as described herein in EQUATION A3. As indicated by row 702, for Pi=2, the MMI (2)=9. As indicated by row 704, for Pi=3, the MMI (2)=6. As indicated by row 706, for Pi=5, the MMI (2)=7. As indicated by row 708, for Pi=7, the MMI (2)=5. As indicated by row 710, for Pi=11, the MMI (2)=14. As indicated by row 712, for Pi=13, the MMI (2)=4.

In at least one embodiment, the MMI (Pi) values of the table 700 may also be precomputed and stored for use at runtime as needed in connection with performing calculations such as in connection with EQUATION A3. In this manner, information of one or more tables, such as illustrated in FIGS. 5, 6, and 7 may be precomputed and stored. Information may be looked up in such tables to obtain desired values as needed when performing calculations as described herein. As will be appreciated by those skilled in the art, the information in table 700 is based on the particular value of PRIMEMAX.

Generally, the false positive ratio or rate as noted above may be estimated as in EQUATION A5 below:

$$\frac{\text{Number of } LUNs}{2^N} \quad \text{EQUATION A5}$$

wherein:

Number of LUNs is the total number of LUNs for which the techniques herein are applied and each assigned a unique prime number Pi; and N is the number of bits of the "result" (e.g., 324 of FIG. 3) value stored with each DB.

The larger the size of PRIMEMAX, and thus the larger the value of N, the lower the expected occurrence of a false positive. In connection with the techniques herein, a false positive is identifying the wrong LUN as the unique sole owner of a DB.

Generally, the impact of a false positive may result in a slight error in determining the amount of physical storage space uniquely owned by a particular LUN.

The techniques herein may be used in connection with any suitable application or task. For example, as noted above, the techniques herein may be used to determine unique ownership for purposes of calculating physical storage space to be reclaimed if a particular LUN (and possibly its associated snapshots, if any) are deleted or migrated to another data storage system. For example, the techniques herein may be used to determine the physical storage space to be reclaimed in a source data storage system for a LUN that will be migrated from a source data storage system to a target data storage system.

Additionally, the techniques herein may be used in connection with selecting which LUNs to migrate from a source to a target data storage system. For example, assume that a data storage administrator is determining which LUNs to migrate from a source data storage system. The administrator may want to move the LUNs based on those consuming the most unique data blocks. The techniques herein may be used to determine the amount of uniquely owned data blocks for each LUN that is a candidate for migration. The list of LUN migration candidates may be ranked based on the amount of uniquely owned storage of each LUN, such as from the LUN having the highest amount of uniquely owned storage to the LUN having the least amount of uniquely owned storage. In this manner, the administrator may choose to migrate one or more of the LUN migration candidates having the highest amount of uniquely owned storage.

The techniques herein may be used to display information to a user or otherwise assess the impact of data reduction with respect to a particular LUN. The techniques herein may be used to determine the uniquely owned storage for a LUN and thus the portion or percentage of the LUN's capacity that has not benefited from deduplication. If the LUN is associated with a particular application, the amount, portion or percentage of uniquely owned data blocks may be used to determine whether to perform data deduplication for subsequent data stored on the LUN. For example, if 90% (or more generally a threshold percentage) of the LUN's data is stored on physical storage that is uniquely owned by the LUN, it may determined that the runtime costs of ILD outweigh the small benefit obtained from data reduction. As such, it may be determined to not perform ILD for data written to the LUN.

Figure 8:
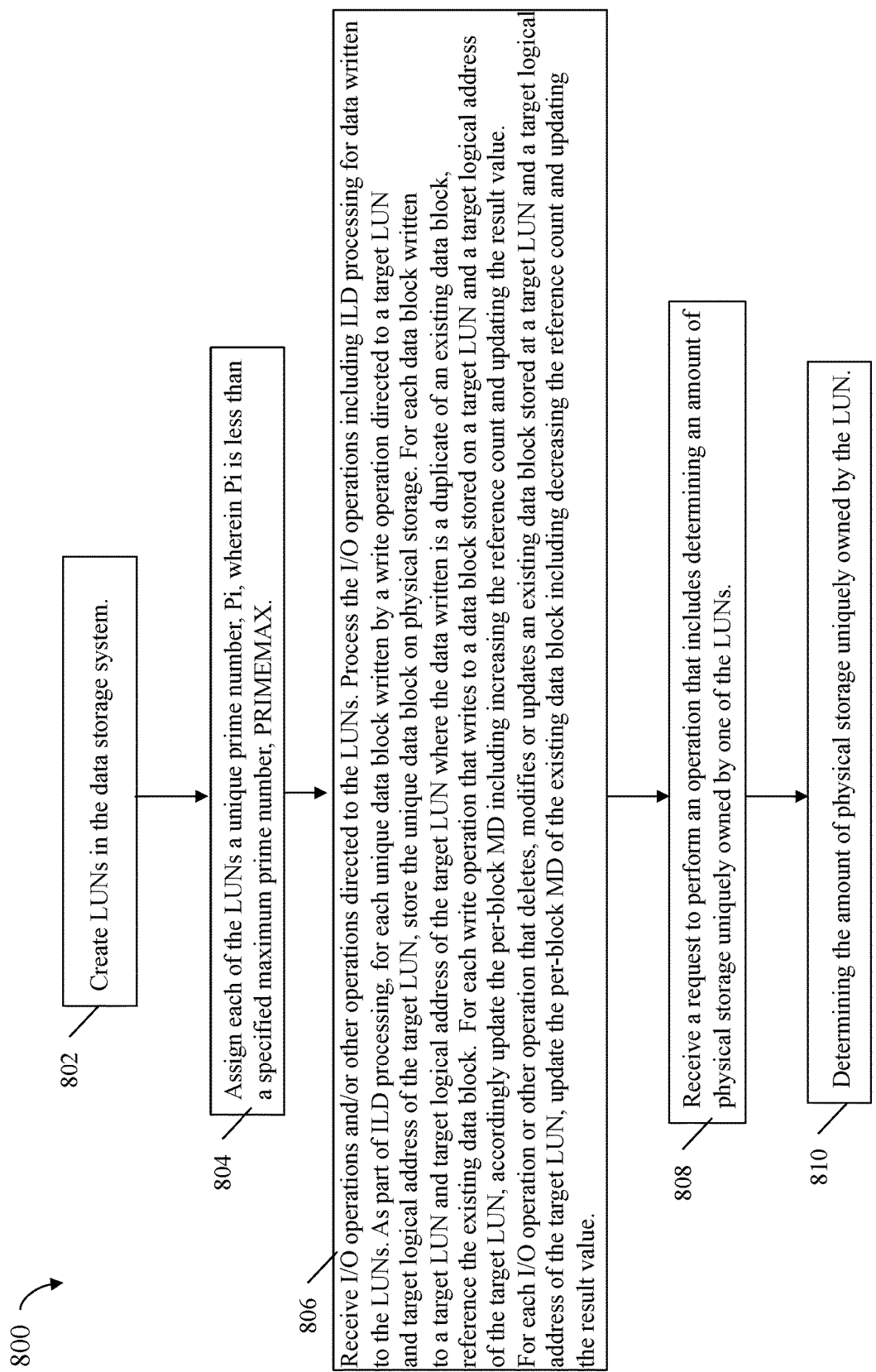
FIGS. 8, 9 and 10 are flowcharts of processing steps that may be performed in an embodiment in accordance with the techniques herein.
Figure 9:
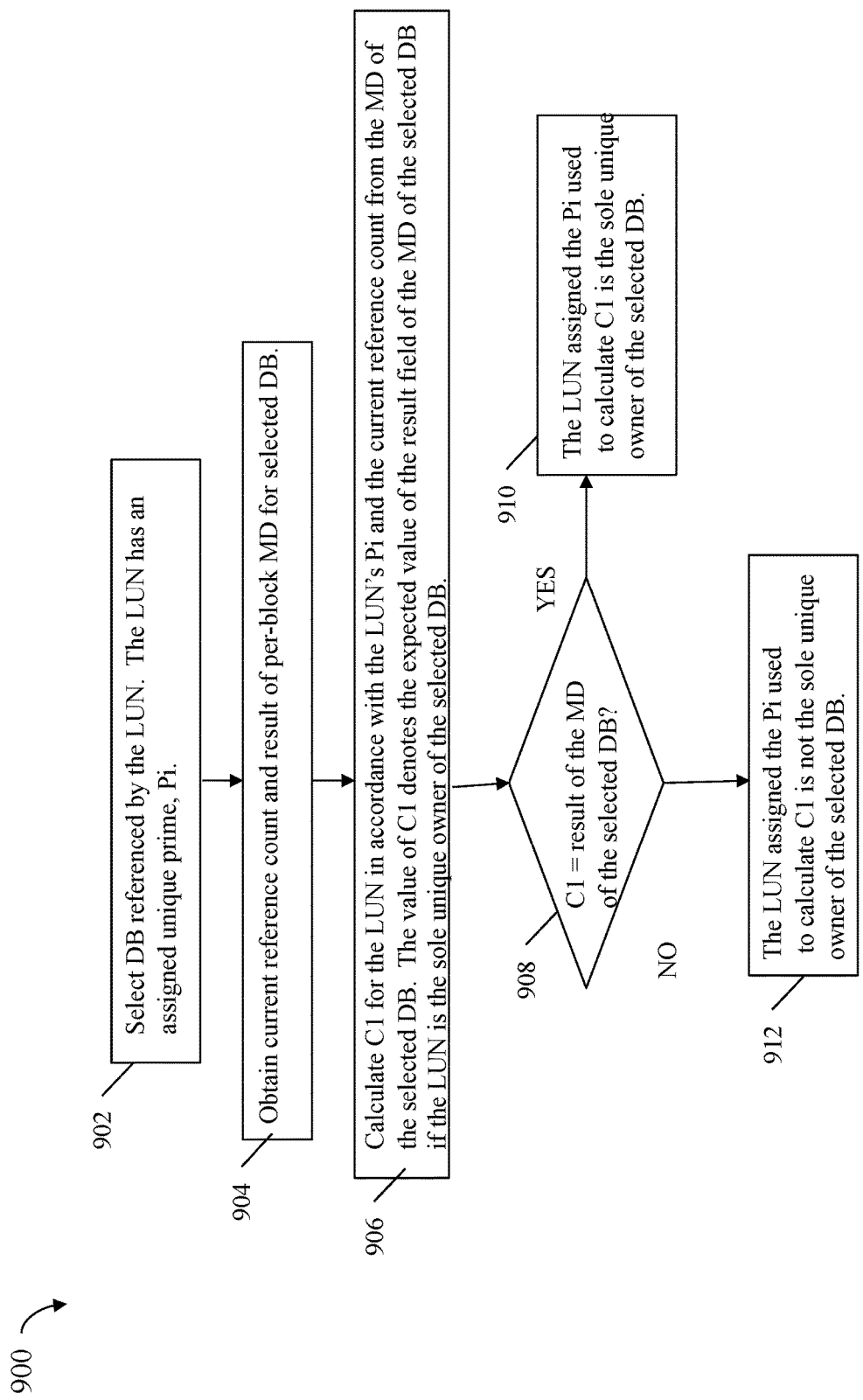
Figure 10:
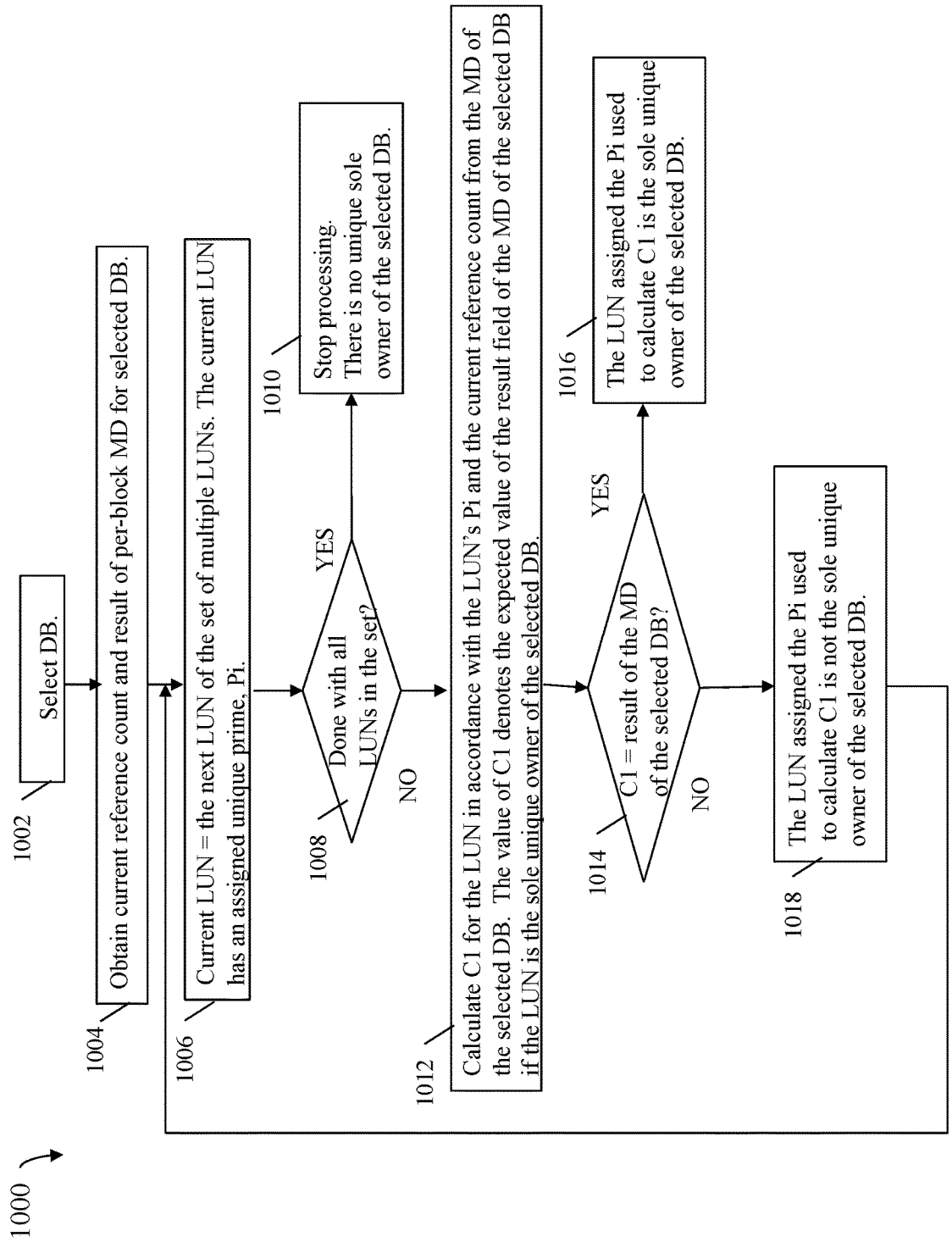

What will now be described in connection with FIGS. 8, 9 and 10 are flowcharts of processing steps that may be performed in at least one embodiment in accordance with the techniques herein. The flowcharts of FIGS. 8, 9, and 10 summarize processing as described above.

Referring to FIG. 8, shown is a first flowchart 800 of processing steps that may be performed in an embodiment in accordance with the techniques herein.

At the step 802, one or more LUNs may be created in the data storage system. From the step 802, control proceeds to the step 804. At the step 804, each of the LUNs created in the step 802 is assigned a unique prime number, Pi, where Pi is less than a specified maximum prime number, PRIME-MAX. From the step 804, control proceeds to the step 806.

At the step 806, one or more I/O operations, as well as other operations, directed to the LUNs may be received. The I/O operations may include write operations. The other operations may include, for example, management commands to delete a LUN. The step 806 may include processing the I/O operations received where such processing include ILD processing for data written to the LUNs. As part of ILD processing, for each unique data block written by a write operation directed to a target LUN and target logical address of the target LUN, store the unique data block on physical storage. For each data block written to a target LUN and target logical address of the target LUN where the data written is a duplicate of an existing data block, reference the existing data block. For each write operation that writes to a data block stored on a target LUN and a target logical address of the target LUN, accordingly update the per-block MD including increasing the reference count and updating the result value (e.g., using EQUATION A2). For each I/O operation or other operation that deletes, modifies or updates an existing data block stored at a target LUN and a target logical address of the target LUN, update the per-block MD of the existing data block including decreasing the reference count and updating the result value (e.g., using EQUATION A3).

From the step 806, control proceeds to the step 808. At the step 808, a request is received to perform an operation that includes determining an amount of physical storage (e.g., number of data blocks) uniquely owned by one of the LUNs (e.g., created in the step 802). From the step 808, control proceeds to the step 810. At the step 810, processing is performed to determine the amount of physical storage owned by the LUN (e.g., the LUN as in the step 808). The physical storage owned by the LUN may be determined by performing processing consistent with discussion herein with respect to all data blocks referenced by the LUN's logical address space. Processing that may be performed in connection with the step 808 is described in more detail in connection with FIG. 9.

Referring to FIG. 9, shown is a second flowchart 900 of processing steps that may be performed in an embodiment in accordance with the techniques herein. The flowchart 900 outlines processing that may be performed with respect to a single data block referenced by a logical address of a LUN. The steps of the flowchart 900 may be repeated for all data blocks referenced by all logical addresses included in a LUN's logical address space.

At the step 902, a data block is selected, where the data block is referenced by a logical address included in the LUN's logical address space. From the step 902, control proceeds to the step 904. At the step 904, processing obtains the current reference count and result of the per-block MD associated with the selected data block. From the step 904, control proceeds to the step 906. At the step 906, C1 is calculated (e.g., as in EQUATION A4) for the LUN (e.g., the same LUN as in step 902 having the assigned prime Pi) in accordance with the LUN's Pi and the current reference count from the MD of the selected data block. The value of C1 denotes the expected value of the result field of the MD of the selected data block, if the LUN is the sole unique owner of the selected data block.

From the step 906, control proceeds to the step 908. At the step 908, processing is performed to determine whether C1 (as calculated in the step 906) is equal to the value of the result of the MD of the selected data block. If the step 908 evaluates to yes, control proceeds to the step 910. At the step 910, the LUN assigned the PI used to calculate C1 (in the step 906) is the sole unique owner of the selected data block. Otherwise, if the step 908 evaluates to no, control proceeds to the step 912. At the step 912, processing determines that the LUN assigned the Pi used to calculate C1 (in the step 906) is not the sole unique owner of the selected DB.

To determine the total number of data blocks referenced by the logical addresses of a particular LUN, the steps of FIG. 9 may be repeated for each referenced data block. The total number of data blocks uniquely owned by the LUN may be determined based on the outcome of FIG. 9 processing for each data block referenced by a logical address of the LUN. The total number of blocks uniquely owned by a particular LUN may be used as information in connection with any suitable command, request or operation, some examples of which are described herein.

Referring to FIG. 10, shown is a third flowchart 1000 including processing steps that may be performed in an embodiment in accordance with the techniques herein. The flowchart 1000 includes steps that may be performed more generally to determine which one of a set of multiple LUNs is the sole unique owner, if any, of a selected data block. Thus, the flowchart 1000 may be viewed in one aspect as a generalization of the processing of FIG. 9 whereby FIG. 9 is performed with respect to a single data block and single LUN and whereby FIG. 10 is performed with respect to a single data block and multiple LUNs.

At the step 1002, a data block is selected. From the step 1002, control proceeds to the step 1004. At the step 1004, the current reference count and result values are obtained from the per-block MD for the selected data block. From the step 1004, control proceeds to the step 1006 where current LUN is assigned the next LUN in a set of multiple LUNs. The current LUN has a assigned unique prime number, Pi. From the step 1006, control proceeds to the step 1008 where a determination is made as to whether processing has traversed all LUNs in the step. If so control proceeds to the step 1010. At the step 1010, processing stops where it is determined that there is no unique sole owner of the selected data block. If the step 1008 evaluates to no, control proceeds to the step 1012. At the step 1012, processing is performed that calculates C1 for the LUN in accordance with the LUN's Pi and the current reference count from the MD of the selected DB. The value of C1 denotes the expected value of the result field of the MD of the selected DB if the LUN is the sole unique owner of the selected DB. From the step 1012, control proceeds to the step 1014 where a determination is made as to whether C1 is equal to the result value of the MD of the selected data block. If the step 1014 evaluates to yes, control proceeds to the step 1016 where it is determined that the LUN assigned the Pi used to calculate C1 (in the step 1012) is the sole unique owner of the selected data block. If the step 1014 evaluates to no, control proceeds to the step 1018 where it is determined that the LUN assigned the PI used to calculate C1 (in the step 1012) is not the sole unique owner of the selected data block. From the step 1018, processing continues with the step 1006 to process the next LUN in the set of multiple LUNs whereby such processing determines whether the next LUN is the sole unique owner of the selected data block.

The techniques herein may be performed by any suitable hardware and/or software. For example, the techniques herein may be performed by executing code which is stored on any one or more different forms of computer-readable media, where the code may be executed by one or more processors, for example, such as processors of a computer or other system, an ASIC (application specific integrated circuit), and the like. Computer-readable media may include different forms of volatile (e.g., RAM) and non-volatile (e.g., ROM, flash memory, magnetic or optical disks, or tape) storage which may be removable or non-removable.

While the invention has been disclosed in connection with embodiments shown and described in detail, their modifications and improvements thereon will become readily apparent to those skilled in the art. Accordingly, the spirit and scope of the present invention should be limited only by the following claims.

What is claimed is:

1. A method of determining unique ownership of data blocks comprising:
   selecting a first data block referenced by a first logical address of a first logical device, wherein first metadata for the first data block includes a reference count and a result and wherein the reference count denotes a number of references to the first data block and the result denotes a value used in determining sole unique ownership of the first data block;
   determining C1, an expected value of the result of the first metadata when the first logical device is a sole unique owner of the first data block; and
   performing first processing that determines whether the first logical device is the sole unique owner of the first data block, wherein the first processing includes:
      determining whether C1 equals a current value of the result of the first metadata; and
      responsive to determining C1 equals the current value of the result of the first metadata, determining that the first logical device is the sole unique owner of the first data block, and otherwise determining that the first logical device is not the sole unique owner of the first data block.

2. The method of claim 1, wherein C1 is determined using the reference count, a maximum prime number, a first prime number that is uniquely assigned to the first logical device.

3. The method of claim 2, wherein the first logical device is one of a plurality of logical devices and each of the plurality of logical devices is assigned a different prime number less than the maximum prime number.

4. The method of claim 3, further comprising:
   writing first data to the first logical address of the first logical device; and
   responsive to said writing, performing second processing including:
      associating the first data block with the first logical address, wherein the first logical address references the first data block;
      incrementing the reference count of the first metadata of the first data block; and updating the result of the first metadata from a first value to a second value, wherein said updating includes:
         determining a first product by multiplying the first value by the first prime number that is assigned to the first logical device; and
         determining the second value as the first value modulo the maximum prime number.

5. The method of claim 4, wherein said second processing further comprises:
   determining that the first data written to the first logical address is a duplicate of other data currently stored in the first data block; and
   updating the first logical address to reference the first data block.

6. The method of claim 4, wherein said second processing further comprises:
   determining that the first data written to the first logical address is not a duplicate of other data currently stored;
   allocating physical storage for the first data block;
   storing the first data at the first data block; and
   updating the first logical address to reference the first data block.

7. The method of claim 4, wherein said second processing is included in data deduplication processing performed for a first write I/O operation that writes the first data to the first logical address of the first logical device.

8. The method of claim 3, further comprising:
   modifying or deleting content stored at the first logical address of the first logical device; and
   responsive to said modifying or deleting content, performing second processing including:
      decrementing the reference count of the first metadata of the first data block; and
      updating the result of the first metadata from a first value to a second value, wherein said updating includes:
         determining a first product by multiplying the first value by a modular multiplicative inverse of the first prime number that is assigned to the first logical device; and
         determining the second value as the first value modulo the maximum prime number.

9. The method of claim 8, wherein said modifying or deleting content stored at the first logical address of the first logical device is performed in connection with an I/O operation directed to the first logical address of the first logical device.

10. The method of claim 8, wherein said modifying or deleting content stored at the first logical address of the first logical device is performed in connection with an operation that deletes the first logical device.

11. The method of claim 10, wherein the operation that deletes the first logical device is a management operation received over a management or control path.

12. The method of claim 8, wherein the modular multiplicative inverse of the first prime number that is assigned to the first logical device is included in a table of computed modular multiplicative inverses for a plurality of prime numbers each less than the maximum prime number.

13. The method of claim 3, wherein C1 is determined using a first value selected from a table of computed values, wherein the table includes a plurality of values corresponding to the first prime number, wherein each of the plurality of values is computed by raising the first prime number to a different integer power greater than 0, and wherein the first value is one of the plurality of values.

14. The method of claim 3, wherein C1 is a first precomputed value selected from a table.

15. A system comprising:
   one or more processors; and a memory comprising code stored thereon that, when executed by at least one of the one or more processors, performs a method of determining unique ownership of data blocks comprising:
- selecting a first data block referenced by a first logical address of a first logical device, wherein first metadata for the first data block includes a reference count and a result and wherein the reference count denotes a number of references to the first data block and the result denotes a value used in determining sole unique ownership of the first data block;
- determining C1, an expected value of the result of the first metadata when the first logical device is a sole unique owner of the first data block; and
- performing first processing that determines whether the first logical device is the sole unique owner of the first data block, wherein the first processing includes:
  - determining whether C1 equals a current value of the result of the first metadata; and
  - responsive to determining C1 equals the current value of the result of the first metadata, determining that the first logical device is the sole unique owner of the first data block, and otherwise determining that the first logical device is not the sole unique owner of the first data block.

16. A non-transitory computer readable medium comprising code stored thereon that, when executed, performs a method of determining unique ownership of data blocks comprising:
- selecting a first data block referenced by a first logical address of a first logical device, wherein first metadata for the first data block includes a reference count and a result and wherein the reference count denotes a number of references to the first data block and the result denotes a value used in determining sole unique ownership of the first data block;
- determining C1, an expected value of the result of the first metadata when the first logical device is a sole unique owner of the first data block; and
- performing first processing that determines whether the first logical device is the sole unique owner of the first data block, wherein the first processing includes:
  - determining whether C1 equals a current value of the result of the first metadata; and
  - responsive to determining C1 equals the current value of the result of the first metadata, determining that the first logical device is the sole unique owner of the first data block, and otherwise determining that the first logical device is not the sole unique owner of the first data block.

17. The non-transitory computer readable medium of claim 16, wherein C1 is determined using the reference count, a maximum prime number, a first prime number that is uniquely assigned to the first logical device.

18. The non-transitory computer readable medium of claim 17, wherein the first logical device is one of a plurality of logical devices and each of the plurality of logical devices is assigned a different prime number less than the maximum prime number.

19. The non-transitory computer readable medium of claim 18, wherein the method further comprises:
- writing first data to the first logical address of the first logical device; and
- responsive to said writing, performing second processing including:
  - associating the first data block with the first logical address, wherein the first logical address references the first data block;
  - incrementing the reference count of the first metadata of the first data block; and
  - updating the result of the first metadata from a first value to a second value, wherein said updating includes:
    - determining a first product by multiplying the first value by the first prime number that is assigned to the first logical device; and
    - determining the second value as the first value modulo the maximum prime number.

20. The non-transitory computer readable medium of claim 19, wherein said second processing further comprises:
- determining that the first data written to the first logical address is a duplicate of other data currently stored in the first data block; and
- updating the first logical address to reference the first data block.

* * * * *